T. H. CURTIS.
STAY BOLT FOR LOCOMOTIVE BOILERS.
APPLICATION FILED APR. 18, 1911.
1,002,229.
Patented Sept. 5, 1911.
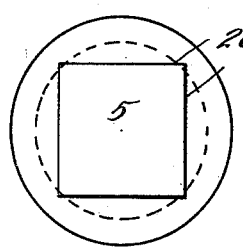
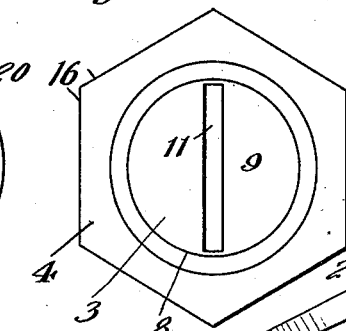
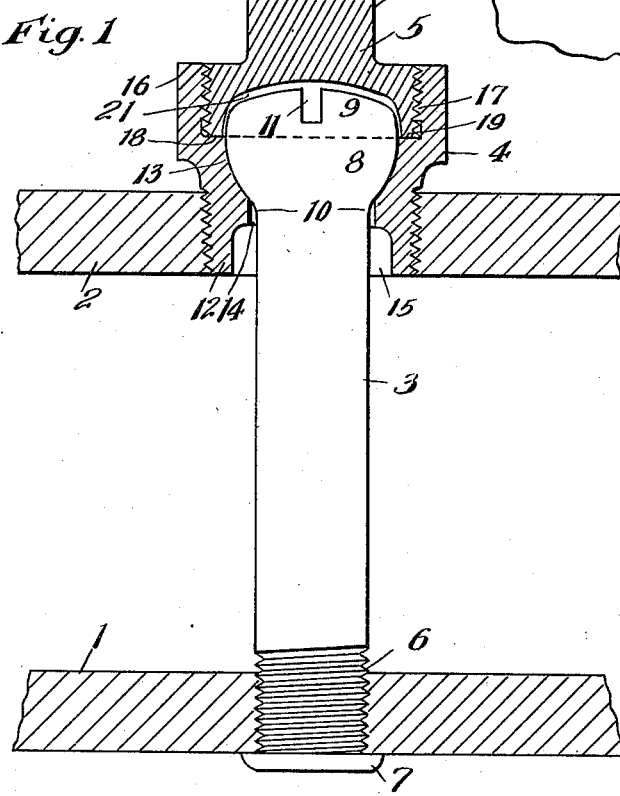
Witnesses:
Ward Barnum,
E. L. Hedgcock
Inventor:
Theodore H. Curtis.

UNITED STATES PATENT OFFICE.

THEODORE H. CURTIS, OF LOUISVILLE, KENTUCKY.

STAY-BOLT FOR LOCOMOTIVE-BOILERS.

1,002,229.     Specification of Letters Patent.     Patented Sept. 5, 1911.

Application filed April 18, 1911. Serial No. 621,920.

*To all whom it may concern:*

Be it known that I, THEODORE H. CURTIS, a citizen of the United States, residing in Louisville, in the county of Jefferson and State of Kentucky, have invented a new and useful Improvement in Stay-Bolts for Locomotive-Boilers, of which the following is a specification.

My invention relates to improvements in stay bolts for steam boilers.

The object of my invention is to provide a so-called flexible stay bolt with a compensating socket for holding the head of the stay bolt, and in which the head of the bolt may be readily and conveniently accessible, without danger or liability of loosening the socket in the boiler sheet, for the purpose of examination and testing the bolt against fracture or breakage, in the usual manner by one man outside the boiler holding a piece of metal against one end of the solid bolt, while another operator hammers on the inner exposed end of the stay bolt, thus enabling by the ear to determine whether any fracture exists in the bolt, and which testing is now required by statute to be done yearly or periodically.

My invention consists in the means I employ to practically accomplish this object or result, the same consisting essentially in a boiler stay bolt threaded and upset at its inner end in the fire box sheet of the boiler in the usual manner, and provided at its outer end with an enlarged partly spherical head, a compensating socket having a reduced screw threaded inner end inserted in the outer boiler sheet and provided with a partly spherical cavity to receive the head of the stay bolt, and provided at its outer end with an enlarged wrench head, preferably externally hexagonal, and having internal screw threads to receive a removable plug which is provided with a reduced externally projecting wrench head and with a cavity to receive the outer portion of the stay bolt head.

In the accompanying drawing forming a part of this specification, Figure 1 is a sectional view, showing a portion of a locomotive boiler with my improved stay bolt in elevation, and the socket and plug members in section. Fig. 2 is a detail plan or end view of the plug member. Fig. 3 is a detail plan or end view of the socket member and bolt with the plug member removed. Fig. 4 is a detail elevation of a portion of a boiler provided with my stay bolts and illustrating the manner of removing the plug member without danger or liability of loosening the socket member.

In the drawing, 1 represents the inner or fire box sheet of a boiler, 2 the outer or shell sheet of the boiler, the steam or water space being between the two sheets, 3 the stay bolt, 4 the socket member and 5 the plug member.

The stay bolt 3 is secured by screw threads 6 at its inner end to the fire box sheet 1 and is also upset or riveted over, as shown at 7 in the usual manner. The stay bolt 3 is further provided with an enlarged, partly spherical or ball bearing head 8 with the outer portion 9 somewhat flattened or struck on a much larger radius than the inner portion, and the stay bolt 3 is preferably further furnished with a reversely curved fillet or neck portion 10 to prevent danger of fracture at the junction of the head with the bolt. The ball bearing head 8 of the bolt is also furnished with a large slot 11 to receive a large screw driver for screwing the stay bolt into the fire box sheet 1 after the socket member 4 is applied to the outer sheet 2.

The socket member 4 has a reduced screw threaded inner end 12 securely screwed into the outer sheet 2, and is provided with a ball bearing or partly spherical seat 13 to receive the ball bearing or partly spherical head 8 of the bolt and permit a slight degree of movement of the bolt in any direction. The socket member 4 is also furnished with an enlarged mouth 14 to receive the neck portion of the bolt, the mouth 14 being preferably of increased diameter at its inner portion 15. The socket member 4 has an enlarged hollow wrench head 16, preferably hexagonal or six faced at its outer end and provided with internal screw threads 17 to receive the plug member 5, and an internal annular shoulder or seat 18 to form a tight joint with the end face or seat 19 of the plug 5, which closes the screw threaded opening in the outer end of the socket member 4.

The plug member 5 is provided at its outer end with a reduced wrench head 20, which I prefer to make square or four faced. The plug member 5 is also provided with a rounded internal cavity 21 to receive the rounded outer portion of the head 8 of the stay bolt.

In operation, the socket member 4 is first screwed in place in the outer sheet 2, the stay bolt 3 is then inserted through the socket 4 and screwed at is inner end into and through the inner sheet 1 until the ball bearing head of the bolt has a firm tight bearing against the socket member 4. Then, before the stay bolt is riveted or upset at its inner end, it is slightly unscrewed to slightly relieve the bearing of the head 8 against the socket member so as to leave the ball bearing head of the bolt free in the socket member. The inner end of the stay bolt is then riveted or upset, as shown at 7, and the plug member 5 is then screwed into the socket member. To inspect or test the stay bolt, a wrench 22 is applied to the wrench head 16 of the socket member 4 and firmly held in place, preferably by wedging its handle against another stay bolt to prevent any liability of the socket member 4 turning, and then with the customary long handled wrench 23, ordinarily two or three feet in length, the workman unscrews the plug 5, thus exposing the outer end of the head of the bolt. A bar or piece of metal is ordinarily held against the outer end of the stay bolt while another man on the inside of the boiler taps on the other end of the stay bolt, thus enabling him to determine with his ear whether there is any fracture in the stay bolt. If the stay bolt proves to be sound, the plug 5 is replaced. If the stay bolt is found to be broken or fractured, it is removed and a new one set in place, the same socket member 4 and plug member 5 being of course usable.

As in my invention, the socket member 4 has a large external wrench head enabling it to be substantially and firmly held against any possibility of turning or loosening when the plug member 5 is being removed for purpose of inspection, however tightly the plug member may become rusted or eroded in place, or however difficult it may be to turn or loosen it, my improved stay bolts can always be properly examined and tested when required. It will of course be understood that if in attempting to turn or remove the plug 5, the socket member 4 should itself turn or unscrew in the outer sheet 2, the hollow stay bolt 3 would necessarily have to be removed by cutting away the upset or rivet head 7, thus destroying the bolt, and this would require the procuring of a stay bolt screw threaded at its inner end exactly similar to the one that is removed, which is often very difficult to obtain, as the fit must be absolutely steam and water tight and the threading taps for stay bolts may vary in size. Heretofore, the only really practical way of proceeding in the contingency above mentioned has been to retap the threaded hole in the inner sheet 1 to receive the new stay bolt and this method continually enlarges the threaded holes in the inner sheet, which is very objectionable.

I claim:

The combination with a stay bolt having a rounded head, of a socket member having an externally screw threaded inner end and a rounded seat to receive the rounded head of the stay bolt, and provided with a hollow internally screw-threaded wrench head at its outer end for holding the socket member as described, and an externally screw-threaded plug member having means at its outer end for engagement by a wrench, substantially as specified.

THEODORE H. CURTIS.

Witnesses:
   PEARL ABRAMS,
   H. W. MUNDAY.

---

Copies of this patent may be obtained for five cents each, by addressing the "Commissioner of Patents, Washington, D. C."